United States Patent
Verenzuela et al.

(10) Patent No.: US 12,413,462 B2
(45) Date of Patent: Sep. 9, 2025

(54) FIRST AND SECOND COMMUNICATION DEVICES AND METHODS

(71) Applicant: Sony Group Corporation, Tokyo (JP)

(72) Inventors: Daniel Verenzuela, Stuttgart (DE); Thomas Handte, Stuttgart (DE); Dana Ciochina-Kar, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 138 days.

(21) Appl. No.: 18/271,244

(22) PCT Filed: Dec. 17, 2021

(86) PCT No.: PCT/EP2021/086468
§ 371 (c)(1),
(2) Date: Jul. 7, 2023

(87) PCT Pub. No.: WO2022/152502
PCT Pub. Date: Jul. 21, 2022

(65) Prior Publication Data
US 2024/0089161 A1   Mar. 14, 2024

(30) Foreign Application Priority Data
Jan. 14, 2021  (EP) .................................... 21151633

(51) Int. Cl.
*H04L 27/26* (2006.01)
*H04L 5/00* (2006.01)
*H04L 25/02* (2006.01)

(52) U.S. Cl.
CPC ........ *H04L 27/2613* (2013.01); *H04L 5/0023* (2013.01); *H04L 25/0226* (2013.01)

(58) Field of Classification Search
CPC . H04L 5/0023; H04L 5/0048; H04L 25/0202; H04L 25/021; H04L 25/0224;
(Continued)

(56) References Cited

U.S. PATENT DOCUMENTS 10,404,336 B1 *  9/2019  Zheng ...................... H04B 7/06
2013/0301551 A1  11/2013  Ghosh et al.
(Continued)

FOREIGN PATENT DOCUMENTS

| WO | WO-2016049817 A1 * | 4/2016 | ........... H04B 7/0413 |
| WO | WO-2017155649 A2 * | 9/2017 | ........... H04L 5/0048 |
| WO | WO-2020096349 A1 * | 5/2020 | ......... H04L 27/2607 |

OTHER PUBLICATIONS

International Search Report and Written Opinion mailed on May 27, 2022, received for PCT Application PCT/EP2021/086468, filed on Dec. 17, 2021, 11 pages including English Translation.
(Continued)

*Primary Examiner* — Young T. Tse
(74) *Attorney, Agent, or Firm* — XSENSUS LLP

(57) ABSTRACT

A first communication device that is configured to transmit data to a second communication device comprises circuitry configured to generate a second number of mutually orthogonal sequences; generate a third number of one or more spatial streams, each spatial stream carrying payload data; split each of a first number of training symbols into a fourth number of tone sets, each training symbol spanning a plurality of tones; split each orthogonal sequence elements of the corresponding portion of the orthogonal sequences onto the tone sets of the training symbols; and arrange the training field before and/or between the payload data of the spatial streams to enable channel estimation by the second communication device.

20 Claims, 9 Drawing Sheets

(58) Field of Classification Search
CPC .............. H04L 25/0226; H04L 27/2602; H04L 27/2605; H04L 27/2607; H04L 27/2613; H04W 84/12
USPC ......... 375/259–267; 370/208–210, 328–330, 370/334, 336, 343
See application file for complete search history.

(56) References Cited

U.S. PATENT DOCUMENTS

| | | | | |
|---|---|---|---|---|
| 2017/0373908 | A1* | 12/2017 | Choi | H04L 27/2675 |
| 2018/0248727 | A1* | 8/2018 | Zhang | H04L 27/2605 |
| 2018/0359066 | A1* | 12/2018 | Mu | H04L 27/2692 |
| 2020/0092142 | A1 | 3/2020 | Sethi et al. | |
| 2020/0145157 | A1* | 5/2020 | Suh | H04L 5/0048 |
| 2024/0089149 | A1* | 3/2024 | Verenzuela | H04L 25/0204 |

OTHER PUBLICATIONS

"Part 11: Wireless LAN Medium Access Control (MAC) and Physical Layer (PHY) Specifications", IEEE Std 802.11™—2020, IEEE Computer Society, Dec. 3, 2020, pp. 1-4377.

"Part 11: Wireless LAN Medium Access Control (MAC) and Physical Layer (PHY) Specifications", IEEE Computer Society, IEEE P802.11ax™/D6.0, Nov. 2019, pp. 1-780.

* cited by examiner

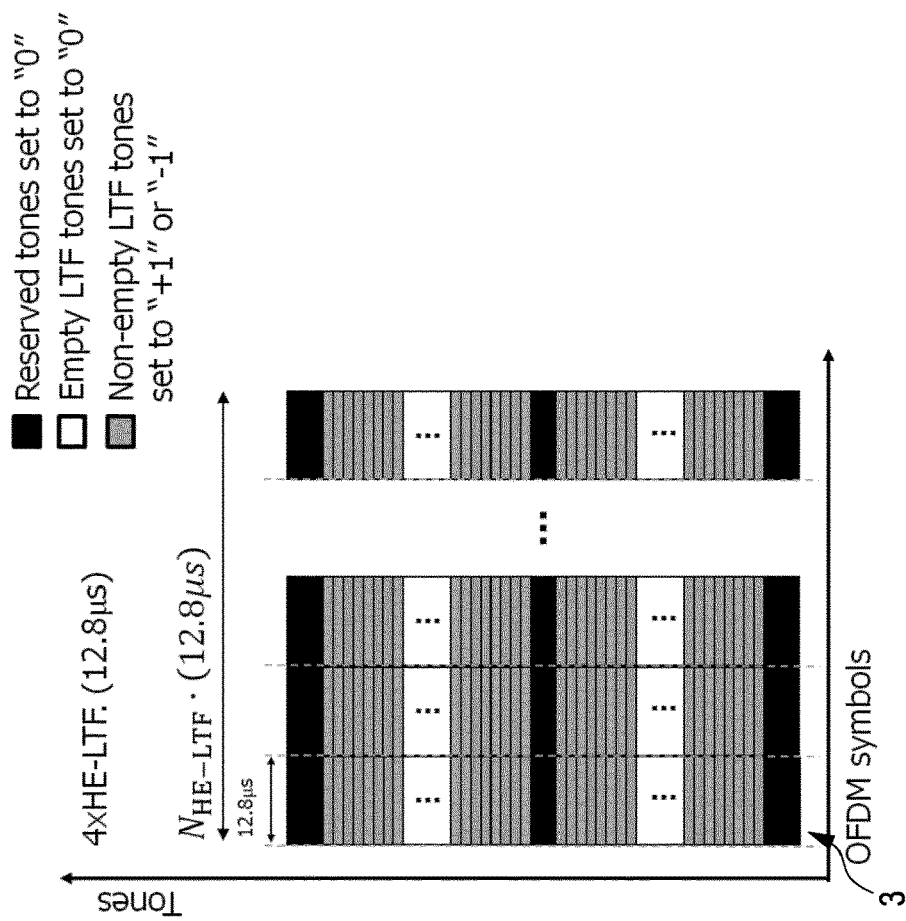
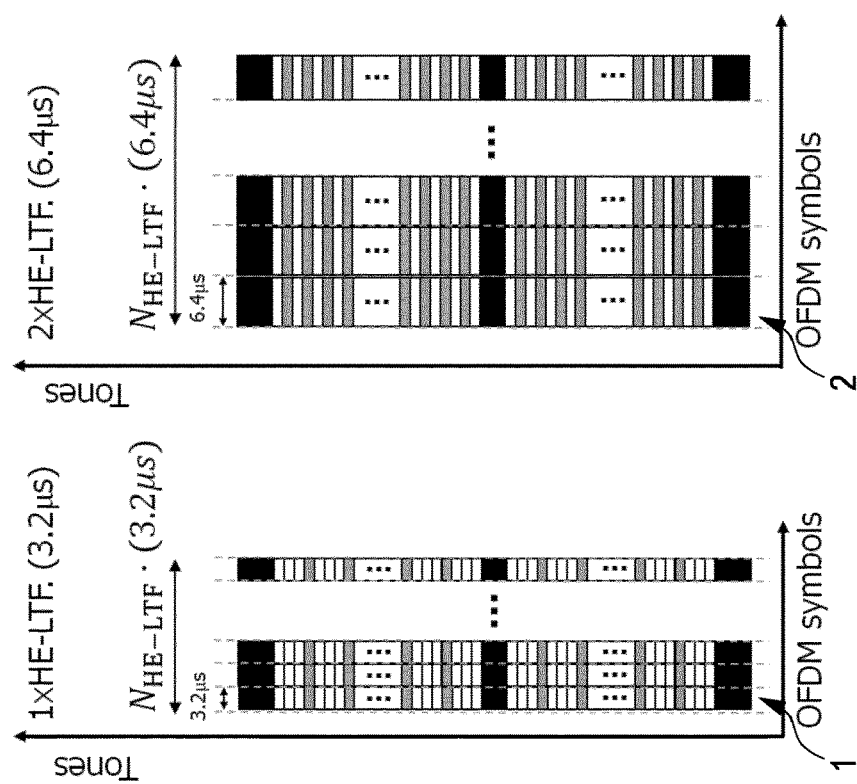
Fig. 1C
Fig. 1B
Fig. 1A

If $mod(k,2) = 1$ : $A^k_{E-LTF} = [P_{E-LTF}]_{1:3,1:2}$

If $mod(k,2) = 0$ : $A^k_{E-LTF} = [P_{E-LTF}]_{1:3,3:4}$ $$P_{E-LTF} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

FIRST AND SECOND COMMUNICATION DEVICES AND METHODS

CROSS-REFERENCE TO RELATED APPLICATIONS

The present application is based on PCT filing PCT/EP2021/086468, filed Dec. 17, 2021, which claims priority to EP 21151633.1, filed on Jan. 14, 2021, the entire contents of each of which are incorporated herein by reference.

BACKGROUND

Field of the Disclosure

The present disclosure relates to first and second communication devices and methods that are configured to communicate with each other.

Description of Related Art

Wireless communications suffer from interference when several transmitters access the channel at the same time and with the same frequency. In distributed access technologies like WLAN, the transmitters contend for the channel and collisions can occur. Moreover, in scenarios with high density of stations (STAs) and access points (APs) many basic service sets (BSS) may overlap, causing unwanted interference. In addition, WLAN operates in unlicensed spectrum which means that other transmitters from other technologies can use the same wireless channel. Due to these reasons, interference can arise during a communication between an STA and an AP or vice versa, leading to a communication disruption. That is, the receiver cannot decode the information causing a decrease in reliability as well as a decrease in throughput and increase in latency since the transmitter would need to retransmit the message.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly nor impliedly admitted as prior art against the present disclosure.

SUMMARY

It is an object to improve detection, channel estimation and suppression of interference at a receiver and to provide corresponding communication devices and methods. It is a further object to provide a corresponding computer program and a non-transitory computer-readable recording medium for implementing said methods.

According to an aspect there is provided a first communication device configured to transmit data to a second communication device, the first communication device comprising circuitry configured to:
  generate a second number of mutually orthogonal sequences;
  generate a third number of one or more spatial streams, each spatial stream carrying payload data;
  split each of a first number of training symbols into a fourth number of tone sets, each training symbol spanning a plurality of tones;
  split each orthogonal sequence into a fourth number of portions;
  generate a training field by mapping elements of the corresponding portion of the orthogonal sequences onto the tone sets of the training symbols; and
  arrange the training field before and/or between the payload data of the spatial streams to enable channel estimation by the second communication device.

According to a further aspect there is provided a second communication device configured to receive data from a first communication device, the second communication device comprising circuitry configured to:
  obtain one or more intended channel observations of one or more channels between the first communication device and the second communication device based on at least a part of a training field, the training field being arranged before and/or between the payload data of a third number of one or more spatial streams received from the first communication device, wherein each spatial stream carries payload data, each of a first number of training symbols is split into a fourth number of tone sets and spans a plurality of tones, and a second number of mutually orthogonal sequences is each split into a fourth number of portions, wherein elements of a corresponding portion of the orthogonal sequences are mapped onto the tone sets of the training symbols to generate the training field;
  perform interference channel estimation of the one or more potential interference channels based on another part of said training field; and
  perform interference suppression based on interference channel estimation information resulting from the interference channel estimation.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed communication method, the disclosed computer program and the disclosed computer-readable recording medium have similar and/or identical further embodiments as the claimed communication devices and as defined in the dependent claims and/or disclosed herein.

One of the aspects of the disclosure is to enable a receiver (i.e. a second communication device) to obtain observations of interfering channels. Hereby, low signaling overhead and high channel estimation quality of intended transmitters is maintained by the present disclosure.

In this context, the terms "intended transmitter" and "intended STA", refer to the device (also called "first communication device" in this disclosure) transmitting the signals that the receiver (e.g. another station or an AP; also called "second communication device" in this disclosure) wants to decode. This means that for the data unit, e.g. a PHY protocol data unit (PPDU; also generally called "data unit" in this disclosure), sent by the intended transmitter, the receiver can achieve synchronization and decode signaling fields that may precede training fields. The "interfering transmitter" or "interferer" (also called "third communication device" in this disclosure) refers to another device (e.g. STA or AP) that is transmitting signals that disrupt the communication between the intended transmitter and the receiver.

The present disclosure enables interference detection, interference channel estimation and interference suppression at the receiver by designing sounding methods that increase the number of channel observations at the receiver compared to the current standard implementation. In an embodiment for increasing the number of channel observations orthogonal (training) sequences are mapped around several frequency tones. This enables the receiver to improve the decoding performance in the presence of interference increasing reliability and reducing the number of data retransmissions. Fewer data retransmissions reduce latency and increase throughput.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein:

FIG. 1 shows a diagram illustrating the three different HE-LTF types as defined in the WLAN 802.11ax amendment;

DETAILED DESCRIPTION OF THE EMBODIMENTS

Figures 2, 3:
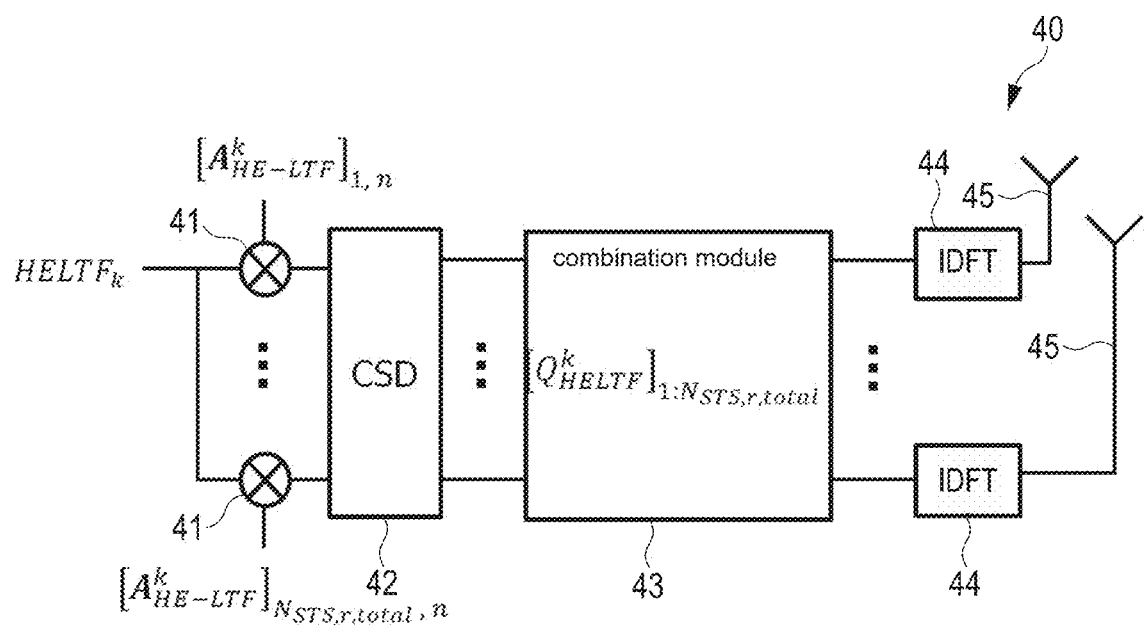
FIG. 2 shows a diagram of an example of orthogonal sequence mapping with four spatial streams.
FIG. 3 shows a schematic diagram of a generator for generating the sounding field as described in WLAN 802.11ax.

According to the WLAN 802.11 standard, the transmitter can adapt the modulation and coding scheme (MCS) to the channel conditions in order to control the level of redundancy of the transmitted information. This can provide robustness against interference at the expense of lower throughput and increased latency.

MIMO technologies have been incorporated into WLAN since several decades and give also the possibility to combat interference thorough signal processing without adding large overhead. If the receiver is equipped with several antennas it can use sounding signals, sent by the transmitters, to estimate the channel and suppress the interference among different spatial streams sent by one or more other (i.e. third party) transmitters.

The main limitation in WLAN is that only the intended transmitters send the sounding signals. If the interference originates from unintended transmitters, due to a collision or external sources, there are no sounding signals or procedures established to detect the presence of interference in an ongoing transmission or estimate the interfering channels.

The sounding signals in the latest WLAN 802.11ax amendment are called high efficiency long training field (HE-LTF). These signals are added within the preamble of a PHY protocol data unit (PPDU) or also in between the PPDUs as midambles inserted with a given periodicity to combat fast channel variations.

Referring now to the drawings, wherein like reference numerals designate identical or corresponding parts throughout the several views, FIG. 1 shows a diagram illustrating the three different HE-LTF types 1, 2, 3 as defined in the WLAN 802.11ax amendment. Each HE-LTF corresponds to one OFDM symbol (also called "training symbol" or "HE-LTF symbol" herein) composed of many tones that span the bandwidth of the channel used. There are three types of HE-LTF symbols 1, 2, 3 with different time durations and number of filled tones, i.e. a first type 1 (called 1×HE-LTF shown in FIG. 1A) with a duration of 3.2 µs of each training symbol, a second type 2 (called 2×HE-LTF shown in FIG. 1B) with a duration of 6.4 µs of each training symbol, and a third type 3 (called 3×HE-LTF shown in FIG. 1C) with a duration of 12.8 µs of each training symbol. The more tones are filled, the longer each HE-LTF symbol is. The number of HE-LTF symbols is denoted by $N_{HE-LTF}$ and is selected in terms of the number of total spatial streams, denoted as $N_{sts}$, such that $$N_{HE-LTF} = \begin{cases} N_{sts} & \text{if } N_{sts} \text{ is } 1, 2, 4, 6, \text{ or } 8 \\ N_{sts} + 1 & \text{if } N_{sts} \text{ is } 3, 5, \text{ or } 7. \end{cases}$$

As shown in FIG. 1 as well, each of the training symbols 1, 2, 3 has a number of reserved tones set to "0", empty LTF tones set to "0" and non-empty LTF tones set to "+1" or "−1".

Based on these designs of HE-LTF signals, the receiver can estimate the MIMO channel between itself and the transmitters at each non-empty tone. The channel estimates corresponding to the empty tones are obtained through interpolation techniques which are out of the scope of this disclosure and implementation dependent, but is generally known to the skilled person. For each non-empty data tone, the MIMO channel estimates are computed at the receiver based on orthogonal sequences of length $N_{HE-LTF}$ that are sent by the transmitters during the $N_{HE-LTF}$ symbols. These orthogonal sequences are stored in a squared matrix (i.e., with equal number of rows and columns) denoted as $P_{HE-LTF}$ (also called orthogonal sequence mapping matrix or HE-LTF mapping matrix herein) and each spatial stream is assigned a row of this matrix to transmit, as illustrated in FIGS. 2 and 3 for the case of $N_{HE-LTF}=4$.

FIG. 2 shows a diagram of an example of orthogonal sequence mapping with four spatial streams (SS). In this context, the term "orthogonal" means that the matrix multiplication of different rows of $P_{HE-LTF}$ is zero. Thus, the receiver can retrieve an observation of the channel between itself and each spatial stream sent by the transmitters without having interference between spatial streams.

FIG. 3 shows a schematic diagram of a generator 40 (of a transmitter) for generating the HE-LTF in described in WLAN 802.11ax (disclosed therein as FIG. 27-32). For the data tones in the HE-LTF, the orthogonal sequences that support MIMO channel estimation are stored in the matrix $A_{HE-LTF}^{k}=P_{HE-LTF}$. Each row, of the first $N_{sts}$ rows, of the $A_{HE-LTF}^{k}$ matrix is assigned to a spatial stream generating $N_{HE-LTF}$ HE-LTF symbols. If the $A_{HE-LTF}^{k}$ matrix has more rows than N sts; the extra rows are not transmitted.

In more detail, the training symbols are called HE-LTF in this case. Initially, the following parameters are selected: the HE-LTF tone sequence (HELTF), the number of HE-LTF symbols ($N_{HE-LTF}$), and the number of spatial streams ($N_{sts}$). The orthogonal sequences are obtained as rows of the squared $P_{HE-LTF}$ matrix (i.e., same number of rows as columns) that consists of mutually orthogonal rows. The number of elements in each orthogonal sequence is equal to $N_{HE-LTF}$. To each spatial stream an orthogonal sequence is assigned. For each tone (indexed by k; it is the same procedure for all tones), each orthogonal sequence is multiplied in a multiplier module 41 with the corresponding HE-LTF tone sequence. This yields $N_{HE-LTF}$ HE-LTF symbols per spatial stream. For example if $N_{sts}=2$, $N_{HE-LTF}=2$ it holds:

$$P_{HE-LTF} = \begin{bmatrix} 1 & -1 \\ 1 & 1 \end{bmatrix}$$

|  | Symbol 1 | Symbol 2 |
|---|---|---|
| SS1 | $HELTF_k \cdot (1)$ | $HELTF_k \cdot (-1)$ |
| SS2 | $HELTF_k \cdot (1)$ | $HELTF_k \cdot (1)$ |

After cyclic shifting in a cyclic shift diversity (CSD) module 42 that introduces a cyclic time shift for the signals of each spatial stream to avoid unintentional beamforming effects when several spatial streams are transmitted, the symbols from all spatial streams are combined by a matrix multiplication in a combination module 43 with the Q matrix to produce the symbols transmitted by each transmit antenna. The Q matrix has as many rows as number of transmit antennas ($N_{TX}$) 45 and as many columns as spatial streams ($N_{sts}$). It shall be noted that the Q matrix can be selected to be different for a subset of tones but the mapping procedure does not change. For each tone it holds that the training symbols can be represented by a matrix $A_k$ with as many rows as spatial streams ($N_{sts}$) and as many columns as the number of HE-LTF symbols ($N_{HE-LTF}$).

The transmitted symbols for each inverse discrete Fourier transformation (IDFT) module 44 and each transmit antenna 45 are read out from the rows of the result of the matrix multiplication $Q \, A_k$. Following the example mentioned above, and assuming a direct spatial mapping where $N_{TX}=2$ and each spatial streams is assigned to one antenna, that is, Q is an identity matrix, it holds:

$$Q = \begin{bmatrix} 1 & 0 \\ 0 & 1 \end{bmatrix}$$

$$A_k = \begin{bmatrix} HELTF_k \cdot (1) & HELTF_k \cdot (-1) \\ HELTF_k \cdot (1) & HELTF_k \cdot (1) \end{bmatrix}$$

$$QA_k = \begin{bmatrix} HELTF_k \cdot (1) & HELTF_k \cdot (-1) \\ HELTF_k \cdot (1) & HELTF_k \cdot (1) \end{bmatrix}$$

The transmission of training symbols per antenna is as follows:

Training symbol 1   Traning symbol 2

$$QA_k = \begin{bmatrix} HELTF_k \cdot (1) & HELTF_k \cdot (-1) \\ HELTF_k \cdot (1) & HELTF_k \cdot (1) \end{bmatrix} \begin{matrix} \text{Transmit atenna 1} \\ \text{Transmit atenna 2} \end{matrix}$$

An alternative example with a different Q matrix assumes an indirect spatial mapping where $N_{TX}=3$ and $$Q = \begin{bmatrix} 0.5 & 0.3 \\ 0.2 & 0.3 \\ 0.3 & 0.4 \end{bmatrix}.$$

The transmitted symbols at each transmit antenna are read out from the rows of the following matrix:

$$QA_k = \begin{bmatrix} 0.5 & 0.3 \\ 0.2 & 0.3 \\ 0.3 & 0.4 \end{bmatrix} \begin{bmatrix} HELTF_k \cdot (1) & HELTF_k \cdot (-1) \\ HELTF_k \cdot (1) & HELTF_k \cdot (1) \end{bmatrix} =$$

Training symbol 1   Traning symbol 2

$$QA_k = \begin{bmatrix} HELTF_k \cdot (0.5+0.3) & HELTF_k \cdot (-0.5+0.3) \\ HELTF_k \cdot (0.2+0.3) & HELTF_k \cdot (-0.2+0.3) \\ HELTF_k (0.3+0.4) & HELTF_k \cdot (-0.3+0.4) \end{bmatrix} \begin{matrix} \text{Transmit atenna 1} \\ \text{Transmit atenna 2} \\ \text{Transmit atenna 3} \end{matrix}$$

The maximum number of channels that can be estimated at the receiver is limited by the number of rows in $P_{HE-LTF}$, that is, the number of HE-LTF symbols $N_{HE-LTF}$ in the WLAN 802.11ax amendment. This means that to detect and estimate more channels than the number of spatial streams $N_{sts}$, like for example the interfering channel, the size of $P_{HE-LTF}$ needs to be larger.

To suppress the interfering signals with MIMO processing, it is necessary for the receiver to obtain an estimate of the interfering channel which means to observe the interference without the presence of the intended STAs. However, this is not possible in the current implementation of WLAN 802.11ax since the number of HE-LTF symbols are designed to match the number of spatial streams in most cases. Moreover, to obtain a good estimate of the interfering channel, several observations are needed and the maximum number of unused HE-LTF symbols is 1.

This disclosure seeks to enable interference detection, channel estimation and suppression at the receiver by designing new sounding methods that increase the number of channel observations compared to the current standard implementation. Thus, for this purpose an enhanced long training field (E-LTF) is envisioned that is built based on HE-LTF signals modified. Several embodiments for such a modification will be discussed in the following.

The modifications disclosed herein take place in the generation of a $A_{E-LTF}^{k}$ matrix that will replace the $A_{HE-LTF}^{k}$ matrix shown in FIG. 2. These modifications include changes on the elements of the $A_{HE-LTF}^k$ matrix as well as its size, since the number of columns of the $A_{HE-LTF}^k$ matrix corresponds to the number of E-LTF symbols (herein also called "training symbols"). These changes will enable interference channel estimation and suppression at the receiver.

To create E-LTF signals, it is defined how many E-LTF symbols will be transmitted. In the WLAN 802.11ax amendment the number of HE-LTF symbols is selected only based on the number of spatial streams, whereas according to the present disclosure the number of E-LTF symbols is chosen to balance the time overhead and the performance of MIMO interference suppression. Thus, in addition to the different embodiments of the proposed sounding methods, a method to select the number of E-LTF symbols will be disclosed as described in the following.

First, the boundaries of how many E-LTF symbols can be sent are evaluated, starting with the minimum number of E-LTF symbols. As mentioned above, at least as many orthogonal sequences (i.e. rows of the $P_{E-LTF}$ matrix which replaces $P_{E-LTF}$ shown in FIG. 2) as the number of spatial streams, denoted as $N_{sts}$, are used. Thus, the minimum number of E-LTF symbols supports the use of a $P_{E-LTF}$ matrix of minimum size of $N_{sts} \times N_{sts}$. In addition, to obtain an estimate of the interference at least one more channel observation than the number of spatial streams $N_{sts}$ needs to be available at the receiver. Based on these conditions the minimum number of E-LTF symbols, denoted by $N_{minE-LTF}$, can be set.

For the maximum number of E-LTF symbols the following considerations hold. Since the E-LTF symbols are used for channel estimation it is necessary that the channel remains approximately static for the duration of the PPDU or until a midamble is sent, which is referred to as the coherence time. It can be estimated at any device based on statistical measurements of signals (e.g. during the association process of the devices to the BSS). Thus, the number of E-LTF symbols is such that the duration of the E-LTF is at least one OFDM symbol lower than the coherence time.

However, in practice it is desirable to have a small number of training symbols compared to data symbols to have a low time overhead, to achieve high throughput and/or low latency. Thus, the maximum number of E-LTF, denoted as $N_{maxE-LTF}$, depends on the specific receiver implementation and channel conditions to limit the time overhead and reach the desired performance in terms of throughput and latency.

Figure 4:
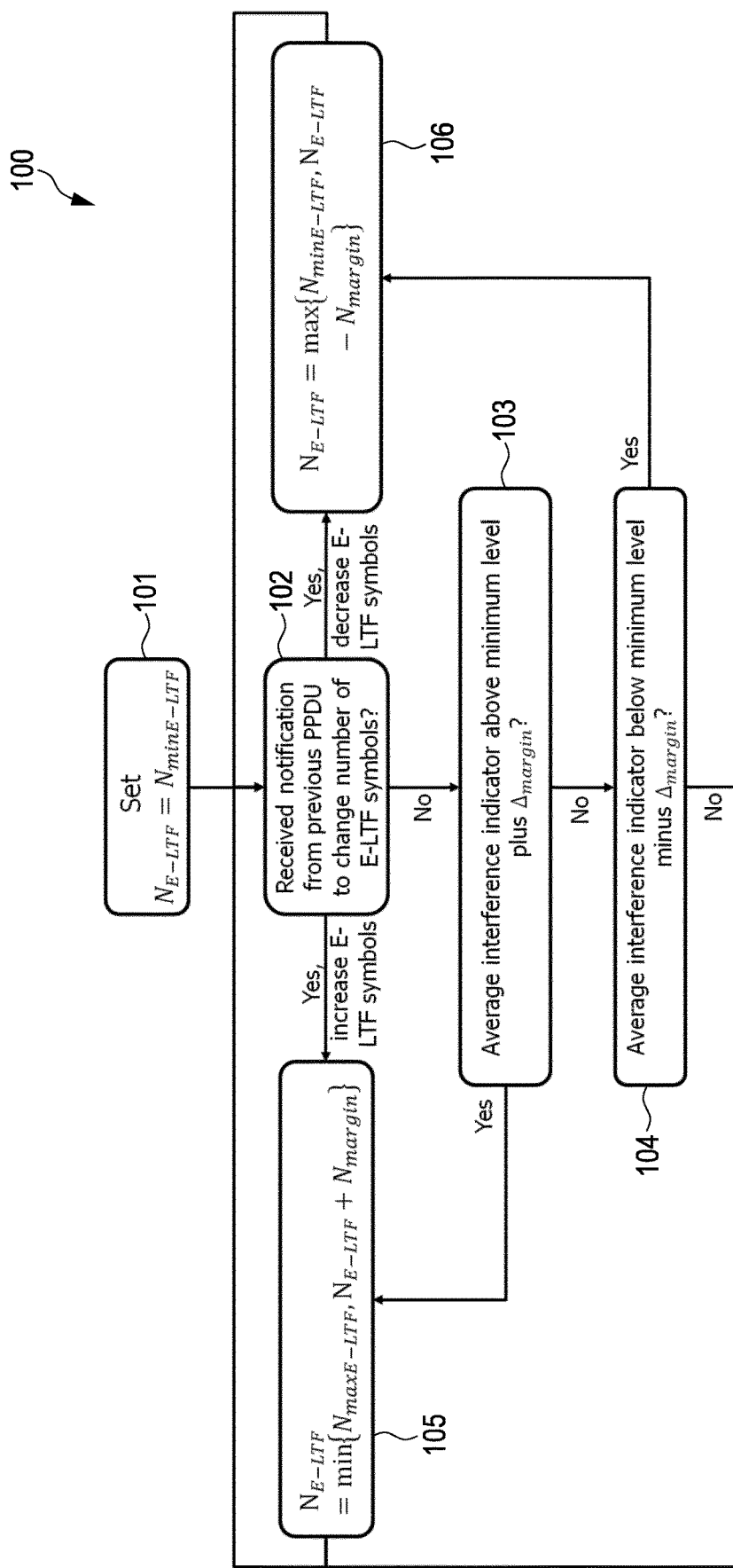
FIG. 4 shows a flow chart of a method for dynamically adjusting the number of training symbols within each data exchange between communication devices.

The performance of the MIMO suppression techniques at the receiver depends on the specific implementation and the channel conditions. Therefore, it is desirable to adapt the number of E-LTF symbols based on each specific situation. FIG. 4 shows a flow chart of a method 100 for dynamically adjusting the number of E-LTF symbols within each data exchange between communication devices. Herein, $N_{margin}$ is the number of E-LTF symbols to add or subtract in each data exchange, and $\Delta_{margin}$ is an interference indicator margin.

In a first step 101, before the first PPDU exchange, the transmitter sets the number of E-LTF symbols to the minimum $N_{minE-LTF}$. Then, the number of E-LTF symbols can be increased or decreased based on notifications made by the receiver after evaluating the performance of MIMO interference suppression in the past PPDUs. An indicator in the signaling fields of the response messages (e.g. Ack or MCS feedback) can be envisioned so that the receiver can suggest whether to increase or decrease the number of E-LTF symbols to the transmitter, which is then checked and decided by the transmitter in step 102.

If no notification is present, then in step 105 the transmitter can increase the number of E-LTF if an interference indicator, averaged over time, is above a set minimum plus a margin $\Delta_{margin}$, which is checked in step 103. This indicator can be created based on one or more of signal-to-interference plus noise (SINR) levels, received power levels, the number of active BSSs, and the number of past collisions, etc. If the interference indicator, averaged over time, is above the aforementioned value, it means that there are many potential interfering devices and the receiver would profit from having more E-LTF symbols for interference suppression. In contrast if the interference indicator, averaged over time, is below the minimum minus a margin $\Delta_{margin}$, which is checked in step 104, this indicates that the number of potential interferers is low and therefore the number of E-LTF symbols is decreased in step 106 to reduce the time overhead.

If neither of the above conditions is met, then the number of E-LTF symbols would remain unchanged for the next transmission. If there a notification is present, as checked in step 102, the number of E-LTF symbols is either increased in step 105 or decreased in step 106 according to the notification. To support the method shown in FIG. 4, the transmitter can e.g. add an indicator in the signaling fields of the PHY preamble to indicate the receiver how many E-LTF symbols are sent in the PPDU. The values of $N_{maxE-LTF}$, $\Delta_{margin}$, $N_{margin}$, and the minimum interference indicator depend on the receiver implementation, channel conditions and target throughput and/or latency constraints.

With respect to $N_{maxE-LTF}$ it is noted that usually a rule of thumb in MIMO communications that involve channel estimation suggests that 50% of the coherence time should be used for training symbols. Thus, $N_{maxE-LTF}$ should not exceed 70% of the coherence time and favorable results can be obtained for $N_{maxE-LTF}$ set to 50% of the coherence time.

With respect to $\Delta_{margin}$ it is noted that this parameter would control how often the number of E-LTFs are changed when no notification is present. In highly dynamic environments like malls or airports, it may be desirable to have this value small so that the number of E-LTFs is adapted at a faster pace. In contrast, in a more static environment like at a private apartment it may be desirable to set $\Delta_{margin}$ to a large value to avoid unnecessary changes to the E-LTFs. In terms of exact values, if the interference indicator is based on SINR or power levels, small values of $\Delta_{margin}$ would be around 3 dB (which means a factor of x2), whereas large values would be between 10-20 dB (i.e., a factor of x10 to x100). It can be said that values below 1 dB are not feasible (since they would incur changes too often) and above 30 dB would result in almost no change of the E-LTFs. However, if the indicator is made based on the number of BSS, or number of past retransmissions, the margin would have different values. For example, if high reliability is desired, then after one retransmission or in the presence of one more BSS in the vicinity, the number of E-LTFs should be changed. A general range can be given in terms relative to the interference indicator. For example, the range of values for the margin would be between 0.5× to 100× the average interference indicator value.

With respect to $N_{margin}$ it is noted that this number should be a positive integer since only integer numbers of symbols can be added. The range of values could be from 1 to $N_{maxE-LTF}-1$, to indicate that the number of E-LTFs can be changed one at the time or makes big changes. From preliminary results it has been seen that doubling the number of E-LTFs can give significant gains. Thus, a typical behavior can be to set $N_{margin}$ equal to a factor of the previous number of E-LTF (e.g., 0.5× to 2×). Alternatively, since the maximum number of spatial streams allowed in IEEE 802.11ax is 8 the typical operation can be set between 1 to 16.

Figure 5:
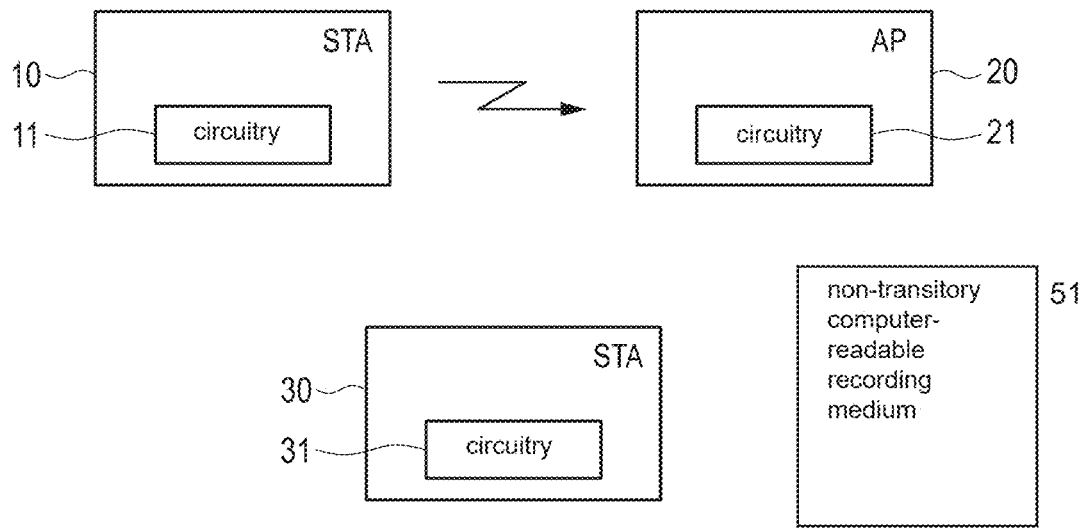
FIG. 5 shows a diagram illustrating a communication system including a first communication device and a second communication device according to the present disclosure.

FIG. 5 shows a diagram illustrating a first communication device 10 (herein also called intended transmitter, representing e.g. a station STA) according to an aspect of the present disclosure for communicating with a second communication device 20 (herein also called receiver, representing e.g. an access point AP). The first communication 10 is able to exchange (receive and/or transmit) data with the second communication device 20 that may, optionally, exchange data with further communication devices (e.g. further stations that are not shown in FIG. 5). This communication, in particular one or more channels used for this communication, may be disturbed by interference, e.g. by a transmission of a third communication device 30 (herein also called non-intended or interfering transmitter, representing e.g. another station).

Each of the communication devices 10, 20, 30 comprises circuitry 11, 21, 31 that is configured to perform particular operations. The circuitries may be implemented by a respective processor or computer, i.e. as hardware and/or software, or by dedicated units or components. For instance, respectively programmed processors may represent the respective circuitries 11, 21, 31.

Figures 6, 7:
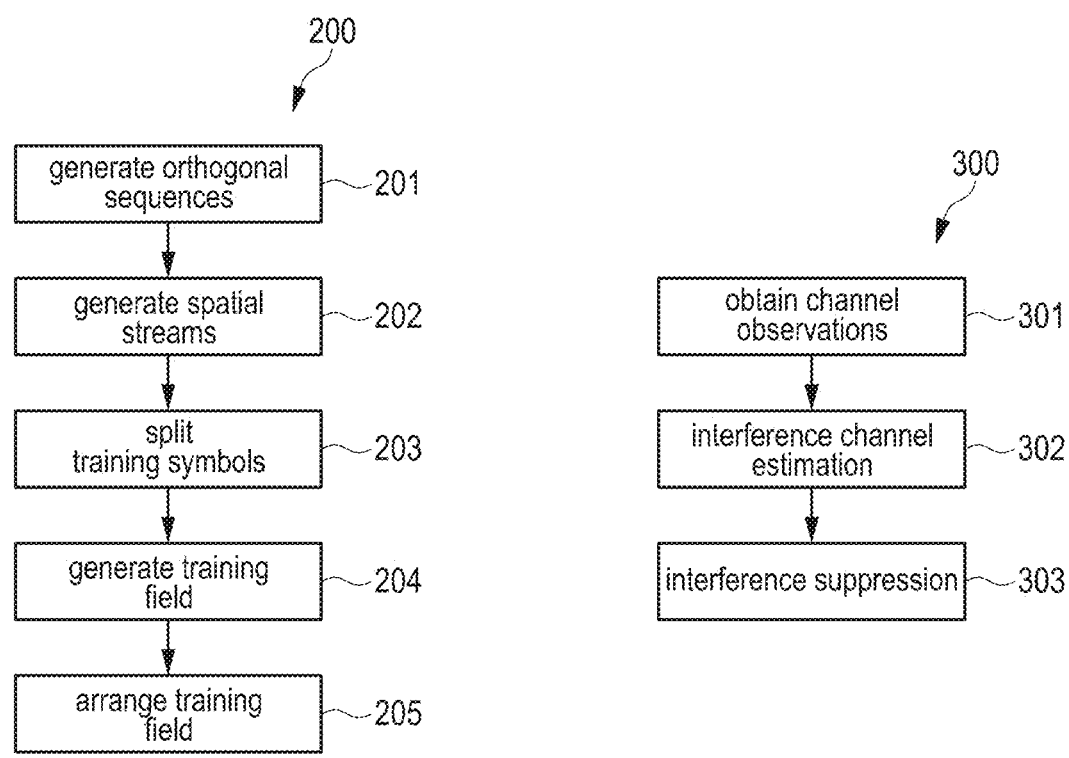
FIG. 6 shows a flow chart of an embodiment of a first communication method of the first communication device according to the present disclosure.
FIG. 7 shows a flow chart of an embodiment of a second communication method of the second communication device according to the present disclosure.

FIG. 6 shows a flow chart of an embodiment of a first communication method 200 of the first communication device 10 according to the present disclosure, which may be performed by the circuitry 11. In a first step 201 a second number of mutually orthogonal sequences is generated. In a second step 202 a third number of one or more spatial streams is generated, each spatial stream carrying payload data. In a third step 203 each of a first number of training symbols is split into a fourth number of tone sets, each training symbol spanning a plurality of tones. In a fourth step 204 each orthogonal sequence is split into a fourth number of portions. In a fifth step 205 a training field is generated by mapping elements of the corresponding portion of the orthogonal sequences onto the tone sets of the training symbols. In a sixth step 206 the training field is arranged before and/or between the payload data of the spatial streams to enable channel estimation by the second communication device.

FIG. 7 shows a flow chart of an embodiment of a second communication method 300 of the second communication device 20 according to the present disclosure, which may be performed by the circuitry 21. In a first step 301 one or more intended channel observations of one or more channels between the first communication device and the second communication device are obtained based on at least a part of a training field. Hereby, the training field is arranged before and/or between the payload data of a third number of one or more spatial streams received from the first communication device, wherein each spatial stream carries payload data, each of a first number of training symbols is split into a fourth number of tone sets and spans a plurality of tones, and a second number of mutually orthogonal sequences is each split into a fourth number of portions, wherein elements of a corresponding portion of the orthogonal sequences are mapped onto the tone sets of the training symbols to generate the training field. In a second step 302 interference channel estimation of the one or more potential interference channels is performed based on another part of said training field. In a third step 303 interference suppression is performed based on interference channel estimation information resulting from the interference channel estimation.

For 2×E-LTF and 4×E-LTF signals, the time duration of the E-LTF symbols is 2 times and 4 times longer compared to 1×E-LTF, respectively, and consequently the number of non-empty tones is multiplied by 2 and 4, respectively. This means that the frequency space between non-empty tones is divided by 2 and 4, respectively. The wireless channel changes with frequency depending on the multipath characteristics of the propagation environment. However, the channel experienced in neighboring tones tends to be highly correlated. This means that it is possible to combine observations from neighboring tones to perform channel estimation.

Figures 8, 9:
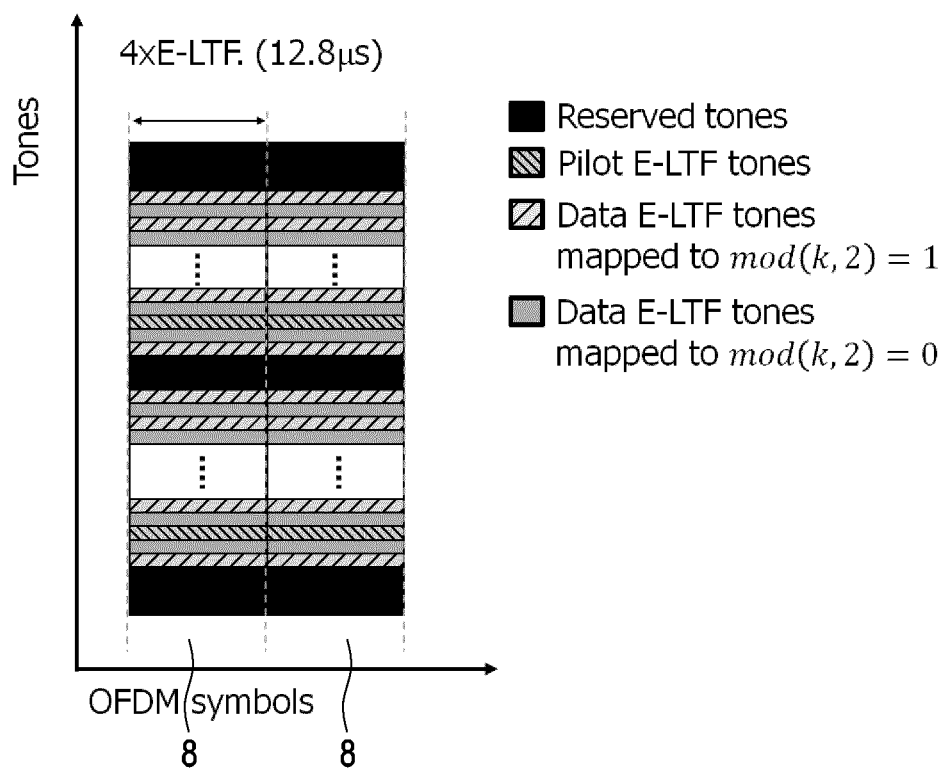
FIG. 8 shows a diagram of an example of orthogonal sequence mapping with three spatial streams according to the present disclosure.
FIG. 9 shows a diagram of an example of a training field with two training symbols according to the present disclosure.

The number of orthogonal sequences to estimate spatial streams is given by the size of the $P_{E-LTF}$ matrix. In the standard operation of WLAN, the size of the $P_{E-LTF}$ matrix is equal to the number of E-LTF symbols. In an embodiment it is proposed to have $P_{E-LTF}$ matrix with larger dimensions than the number of E-LTF symbols, and map its rows around non-empty neighboring tones. This results in more orthogonal sequences (i.e., rows of the $P_{E-LTF}$ matrix) to gain more observations for channel estimation of intended STAs and interferers. Since the sequences are preferably mapped around non-empty tones, the number and location of non-empty tones does not change. The mapping technique is illustrated in FIGS. 8 and 9. FIG. 8 shows the $P_{E-LTF}$ matrix having a size of 4×4 with four orthogonal sequences (one per row) of four elements. The orthogonal sequences are mapped into two E-LTF symbols (i.e., $N_{E-LTF}=2$) and two neighboring non-empty data tones (denoted as $N_{wt}=2$) as shown in FIG. 9 depicting a sounding field with two training symbols 8. In this example, the transmission time duration corresponds to two E-LTF symbols. Also, three spatial streams from the intended transmitters are assigned to three orthogonal sequences. Thus, there is one unused orthogonal sequence that can be used for estimating the interfering channel.

Thus, in this example it holds for data tones:

$$[A^k_{E-LTF}]_{m,n} = [P_{E-LTF}]_{m,I^k_n}$$

$$I^k_n = \begin{cases} n + N_{E-LTF}(N_{wt} - 1) & \text{if } \mod(k, N_{wt}) = 0 \\ n + N_{E-LTF}(\mod(k, N_{wt}) - 1) & \text{if } \mod(k, N_{wt}) \neq 0 \end{cases}$$

where index k indicates the tone, index n indicates the E-LTF symbol to transmit and index m indicates the spatial stream. In the example illustrated in FIGS. 8 and 9, the number (also called "fourth number") of neighboring tones to map is $N_{wt}=2$, the number (also called "first number") of E-LTF symbols is $N_{E-LTF}=2$, the number (also called "second number") of mutually orthogonal sequences, which is equal to the number of elements of an orthogonal sequence, is $N_{co-P_{E-LTF}}=4$ and the number (also called "third number") of spatial streams is $N_{sts}=3$.

The indicator $I^k_n$ is created to map which columns of the $P_{E-LTF}$ matrix are mapped to which E-LTF symbol and data tone. It is important to consider that, since all columns of the $P_{E-LTF}$ matrix are needed to compute the channel estimates, the mapping of the $P_{E-LTF}$ matrix columns should include neighboring data tones. However, in each E-LTF symbol, some tones are reserved (e.g., guard frequencies, DC) and others are assigned to pilots. Thus, the following conditions should be fulfilled:

a) The size of the $P_{E-LTF}$ matrix shall be ($N_{wt} \cdot N_{E-LTF} \times N_{wt} \cdot N_{E-LTF}$).

b) The number of neighboring non-empty data tones to map, denoted as $N_{wt}$, shall not be greater than the minimum number of uninterrupted non-empty data tones across the total transmission bandwidth, denoted as $N_{wt}$. Here, uninterrupted means that no reserved or pilot tones are present in between non-empty data tones.

c) The $I_n^k$ indicator shall divide the columns of the $P_{E-LTF}$ matrix into $N_{wt}$ groups and map them to neighboring tones. An example of such mapping is given by $$I_n^k = \begin{cases} n + N_{E-LTF}(N_{wt} - 1) & \text{if } \mod(k, N_{wt}) = 0 \\ n + N_{E-LTF}(\mod(k, N_{wt}) - 1) & \text{if } \mod(k, N_{wt}) \neq 0 \end{cases}$$

where k corresponds to the index of tone and n corresponds to the index of E-LTF symbol.

As mentioned above, the number of available orthogonal sequences is determined by the product between number of E-LTF symbols times the number of neighboring non-empty data tones to map (a fifth number of neighboring tones forming a group of neighboring tones), that is $N_{E-LTF} \cdot N_{wt}$. The number of E-LTF symbols can be selected by the method illustrated in FIG. 4 and needs to satisfy the condition $$N_{E-LTF} \cdot N_{wt} \geq N_{sts} + 1.$$

Thus, the minimum number of E-LTF is given by $$N_{minE-LTF} = \max\left\{1, \left\lceil \frac{N_{sts} + 1}{N_{wt}} \right\rceil \right\}$$

where the operator [•] stands for rounding to the largest nearest integer (e.g., $\lceil 0.1 \rceil = 1$, $\lceil 1.3 \rceil = 2$).

To determine the number of neighboring non-empty data tones to map ($N_{wt}$) it is important to consider the channel properties. A key characteristic of mapping neighboring tones is that only one channel estimate per orthogonal sequence can be obtained. This means that if several neighboring non-empty tones are mapped, their channel estimates will come from the same observation. Thus, if the channel changes significantly between tones the mapping technique may give poor channel estimates.

For the transmitter to determine how many neighboring tones can be mapped together, it may estimate how correlated is the channel between tones. This can be done by looking at the LTF in the response PPDU messages (e.g., clear-to-send (CTS), Ack, MCS feedback). In the case no response message is available from previous transmissions, the transmitter can use a default mapping in the first PPDU that is selected based on initial measurements of interference (e.g., level of average received power and/or number of active BSS in the vicinity of the devices, and/or SINR). While the channel itself changes rapidly, however, the correlation between tones changes at a slower pace, so that the transmitter can track this correlation between tones over a longer period of time.

Figure 10A:
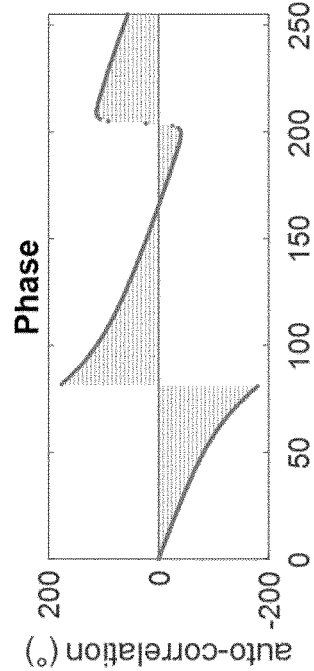
FIG. 10 shows diagrams illustrating an example of the magnitude and phase of the auto-correlation function between tones of a typical WLAN channel model.
Figure 10B:
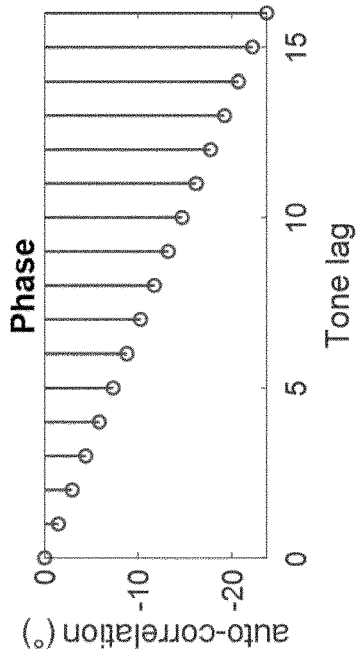
Figure 10C:
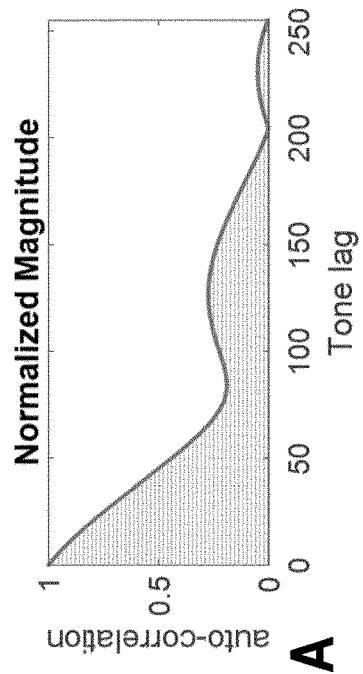
Figure 10D:
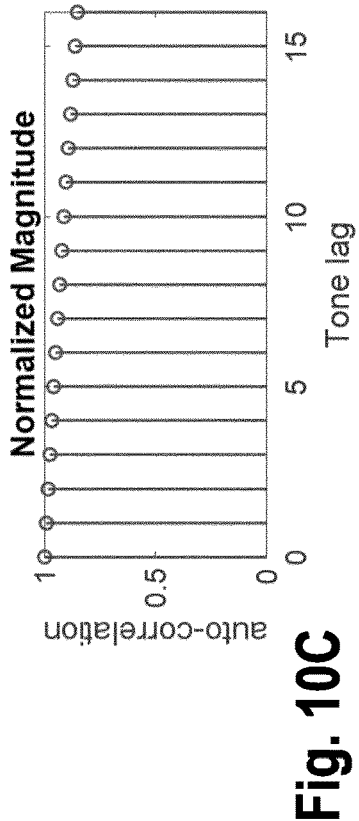

Based on the measurement of channel correlation between tones, the transmitter can decide how many tones can be mapped. FIG. 10 shows an example of the magnitude and phase of the auto-correlation function between tones of a typical WLAN channel model. FIGS. 10A and 10B show diagrams of magnitude and phase of tone auto-correlation for a random realization of a 20 MHz channel with all 256 tones. FIGS. 10C and 10D show diagrams of magnitude and phase of only the first 16 tones.

It can be seen in FIG. 10 that neighboring tones (small tone lag in FIG. 10) exhibit very similar magnitude and little phase deviation. In the standard, a minimum magnitude ($M_{min-ac}$) and maximum phase ($\theta_{max-ac}$) of the channel auto-correlation function, denoted as r(k), can be defined to determine the maximum a number of tones that can be mapped together, denoted as $N_{max-wt}$. That is, $$N_{max-wt} = \max\{k\} \text{ for } k \in \{1, \ldots, N_{ut}\}$$

such that $|r(k)| \div M_{min-ac}$ and $|\arg(r(k))| \leq \theta_{max-ac}$ where arg(•) returns the phase of the argument. Note that the minimum value that $N_{wt}$ can take is "1" which essentially corresponds to the standard implementation where no neighboring tones are mapped together. Recall that $N_{ut}$ corresponds to the minimum number of uninterrupted non-empty data tones across the total transmission bandwidth.

The exact number of mapped tones can be indicated to the receiver in one of the PHY signaling fields in the preamble of the PPDU. After each PPDU sent by the transmitter, the receiver can assess the effectiveness of the interference suppression method (e.g. SI NR level and/or value of log-likelihood ratios per decoded symbol) and suggest another number of mapped tones to be used in the next PPDU. An indicator in the signaling fields of response messages (e.g. Ack, MCS feedback) can be envisioned so that the receiver can suggest another number of mapped tones to the transmitter. The selection of the number of mapped tones depends on the receiver implementation and channel conditions. Thus, the process illustrated in FIG. 4 to select the number of E-LTF symbols can be adapted to select the number of mapped tones as shown in FIG. 11.

Figure 11:
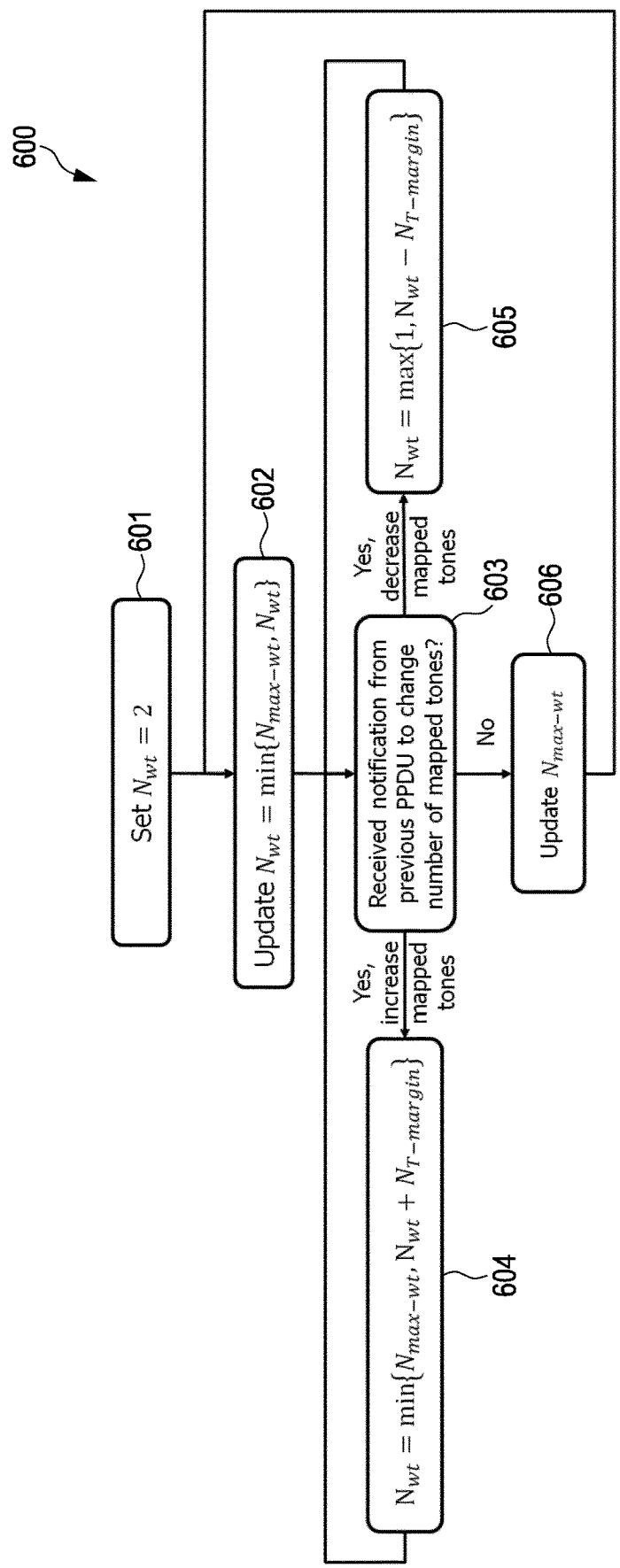
FIG. 11 shows a flow chart of a method for selecting the number of mapped neighboring non-empty tones.

FIG. 11 shows a flow chart of a method 600 to select the number of mapped neighboring non-empty tones. $N_{T-margin}$ is the number of mapped tones to add or subtract in each data exchange. Before the first PPDU exchange, in a first step 601 the transmitter sets the number of mapped neighboring tones to "2", which is the minimum for the tone mapping to support longer orthogonal sequences compared to the standard. Then, in step 602 the number of mapped neighboring tones is compared to the maximum that is allowed by the channel $N_{max-wt}$.

Then, the number of mapped neighboring tones can be increased (step 604) or decreased (step 605) based on notifications (as checked in step 603) made by the receiver after evaluating the performance of MIMO interference suppression in the past PPDUs. An indicator in the signaling fields of response messages (e.g., Ack, MCS feedback) can be envisioned so that the receiver can suggest whether to increase or decrease the number of mapped neighboring tones to the transmitter.

If no notification is present, the maximum number of mapped neighboring tones is updated in step 606 as follows $$N_{max-wt} = \max\{k\} \text{ for } k \in \{1, \ldots, N_{ut}\}$$

such that $|r(k)| \geq M_{min-ac}$ and $|\arg(r(k))| \leq \theta_{max-ac}$ based on the auto-correlation function from most recently received signals from response messages from the receiver. If neither of the above conditions is met, then the number of mapped neighboring tones would remain unchanged for the next transmission. The values of $N_{max-wt}$ and $N_{T-margin}$ depend on the receiver implementation, channel conditions and target throughput and/or latency constraints and will thus not be discussed in more detail in this disclosure. The range for $N_{T-margin}$ can be from 1 to $N_{ut}-1$. Typical values may be between 1 to 4, but higher values may be used as well.

The design of HE-LTF sequences and orthogonal sequences in the $P_{HE-LTF}$ matrix is done separately. The $P_{HE-LTF}$ matrix requires the rows to be orthogonal and its design is done to facilitate the separation of channels from different spatial streams. The HE-LTF sequences are designed to reduce PAPR, and in the standard implementation, the same orthogonal sequence (i.e., row of the $P_{HE-LTF}$ matrix) assigned to a spatial stream is replicated for all non-empty tones, and then, multiplied by the HE-LTF sequence (as shown e.g. in FIG. 3 where all HE-LTF symbols in the $k^{th}$ tone, are multiplied with the same $HELTF_k$ value). This assures that the variations on the tone values is only determined by the HE-LTF sequence and the PAPR is within acceptable levels.

When mapping the orthogonal sequences of the $P_{E-LTF}$ matrix among neighboring non-empty tones, it may happen that the E-LTF sequence is modified, and in turn, the PAPR performance changes. For example, the E-LTF sequence for the second E-LTF symbol is changed.

To avoid altering the structure of E-LTF sequences or mitigate this effect on the PAPR, the $P_{E-LTF}$ matrix can be formed in blocks based on a Hadamard method. The design of the $P_{E-LTF}$ matrix creates blocks that are replicated across rows and columns (with some minus multiplication in some cases). This means that the rows on each block will have column values repeated $N_{wt}$ times, and when the mapping is done, the E-LTF sequence will remain unchanged. Thus, when the number of spatial streams is lower than the number of E-LTF symbols, the PAPR performance will not change.

In cases where the design of the $P_{HE-LTF}$ matrix introduces changes to the E-LTF sequence structure, the PAPR values should be evaluated to make sure they are within acceptable values. It is noted that since the tone mapping has a well-defined pattern given by the $I_n^k$ indicator, it is possible to modify existing E-LTF sequences to reduce the PAPR. If there is correlation across non-empty tones (which is the common case across WLAN channels), the number of orthogonal sequences can increase significantly without adding extra time overhead, making this approach very appealing for latency sensitive traffic.

Thus, according to the embodiment explained above, initially the following parameters are selected: The E-LTF tone sequence (ELTF), the number of E-LTF symbols ($N_{E-LTF}$) ("first number"), and the number of spatial streams ($N_{sts}$) ("third number"). The orthogonal sequences are obtained as rows of the squared $P_{E-LTF}$ matrix (i.e., same number of rows as columns) that consists of mutually orthogonal rows. The orthogonal sequences are split into several (a "fourth number") portions which are mapped into different frequency tones of different tone sets. The number of portions is given by the number of mapped tones $N_{wt}$ ("fourth number"). The number of elements in each portion is $N_{E-LTF}$. The total number ("second number") of elements in each orthogonal sequence is equal to $N_{col-P_{E-LTF}} = N_{wt} \cdot N_{E-LTF}$. Each spatial stream is assigned an orthogonal sequence. There are more orthogonal sequences than spatial streams, that is, $N_{sts} + 1 \leq N_{col-P_{E-LTF}}$.

In an exemplary implementation of the disclosed mapping method, $N_{wt}$ sets of tones are defined such that each portion of the orthogonal sequences are assigned to each set of tones. Each portion of the orthogonal sequence is multiplied with the corresponding set of tones of the $N_{E-LTF}$ E-LTF symbols.

In an example it holds: $N_{sts}=2$, $N_{E-LTF}=2$, $N_{wt}=2$, $N_{col-P_{E-LTF}} = N_{wt} \cdot N_{E-LT}$. There are $N_{wt}=2$ sets of tones that are defined as even tones and odd tones. The portion of the odd tones may e.g. be the first two columns of the $P_{E-LTF}$ matrix shown in FIG. 8 and the portion of the even tones may e.g. be the last two columns of the $P_{E-LTF}$ matrix shown in FIG. 8. For an odd tone (indexed by k) it holds:

|  | Symbol 1 | Symbol 2 |
| --- | --- | --- |
| SS1 | $ELTF_k \cdot (1)$ | $ELTF_k \cdot (-1)$ |
| SS2 | $ELTF_k \cdot (1)$ | $ELTF_k \cdot (1)$ |

For an even tone (indexed by k+1) it holds:

|  | Symbol 1 | Symbol 2 |
| --- | --- | --- |
| SS1 | $ELTF_{k+1} \cdot (1)$ | $ELTF_{k+1} \cdot (1)$ |
| SS2 | $ELTF_{k+1} \cdot (-1)$ | $ELTF_{k+1} \cdot (1)$ |

In another example it holds: $N_{sts}=2$, $N_{E-LTF}=1$, $N_{wt}=4$, $N_{col-P_{E-LTF}} = N_{wt} \cdot N_{E-LTF} = 4$. There are $N_{wt}=4$ sets of tones that are defined by the modulus operation:

|  | Condition on tone index k | Examples of tone set |
| --- | --- | --- |
| Set 1 | mod(k, 4) = 1 | [1, 5, 9, 13, 17, . . .] |
| Set 2 | mod(k, 4) = 2 | [2, 6, 10, 14, 18, . . .] |
| Set 3 | mod(k, 4) = 3 | [3, 7, 11, 15, 19, . . .] |
| Set 4 | mod(k, 4) = 0 | [4, 8, 12, 16, 10, . . .] |

The portion for tone set 1 may e.g. be the first column of the $P_{E-LTF}$ matrix shown in FIG. 8, the portion for tone set 1 may e.g. be the first column of the $P_{E-LTF}$ matrix, and so on. Then, for k in tone set 1 it holds:

|  | Symbol 1 |
| --- | --- |
| SS1 | $ELTF_k \cdot (1)$ |
| SS2 | $ELTF_k \cdot (1)$ |

For k in tone set 2 it holds:

|  | Symbol 1 |
| --- | --- |
| SS1 | $ELTF_k \cdot (-1)$ |
| SS2 | $ELTF_k \cdot (1)$ |

For k in tone set 3 it holds:

|  | Symbol 1 |
| --- | --- |
| SS1 | $ELTF_k \cdot (1)$ |
| SS2 | $ELTF_k \cdot (-1)$ |

For k in tone set 4 it holds:

|  | Symbol 1 |
| --- | --- |
| SS1 | $ELTF_k \cdot (1)$ |
| SS2 | $ELTF_k \cdot (1)$ |

Thus, according to the present disclosure each spatial stream is identified by a distinct orthogonal sequence which has been mapped to the training symbols. Since there may be more than one spatial stream, after mapping distinct orthogonal sequences with the training symbols there are distinct sets of training symbols, one per spatial stream. The already distinct sets of training symbols are then mapped to transmit antennas along with the payload data per spatial stream.

The different portions of each of the orthogonal sequences are mapped into different tones and a full orthogonal sequence should always be found mapped into neighboring tones. For example, if the orthogonal sequences are split into four portions, then in any set of (non-reserved) four neighboring tones there should be all portions mapped.

Any group of neighboring tones that contain all portions of the orthogonal sequence need experience similar channel realizations. Thus, to decide the maximum number of portions (also referenced as fifth number herein) it may be checked how similar the channel among neighboring tones is, which may be done by measuring the channel correlation between tones. For example, if the channel correlation is measured and the channel changes very little between four neighboring tones, the orthogonal sequences may be split into four portions. However, if the channel changes significantly between eight neighboring tones, it is preferred not to use eight portions.

The channel correlation between tones changes gradually the further the tones are apart. Hence, as in the example above if the channel changes little between four neighboring tones, the best number of mapped tones can be for example 2,3, or 4. Then, perhaps after 5 or 6 tones, the correlation starts to decrease and for 8 tones the channel correlation may be too low. The maximum number of mapped tones ("fifth number") may thus be set around 4, 5 or 6 tones, for example.

The fifth number represents the maximum number of neighboring tones where different portions of orthogonal sequences can be mapped. That is, the fifth number may be the maximum value that the fourth number can have. If the orthogonal sequences were split into four portions, each of the tone sets would contain all four portions if they do not include reserved tones.

Neighboring tones refer to tones that are next to each other in frequency. An OFDM symbol is composed of many tones, each having a frequency value. The tones are often indexed by a set of integer numbers. For example: 256 tones are indexed from −127 to +128 (including 0). A group of four neighboring tones thus may refer to sets like: [9 10 11 12], [−23 −22 −21 −20], [31 32 33 34], etc.

Figure 12:
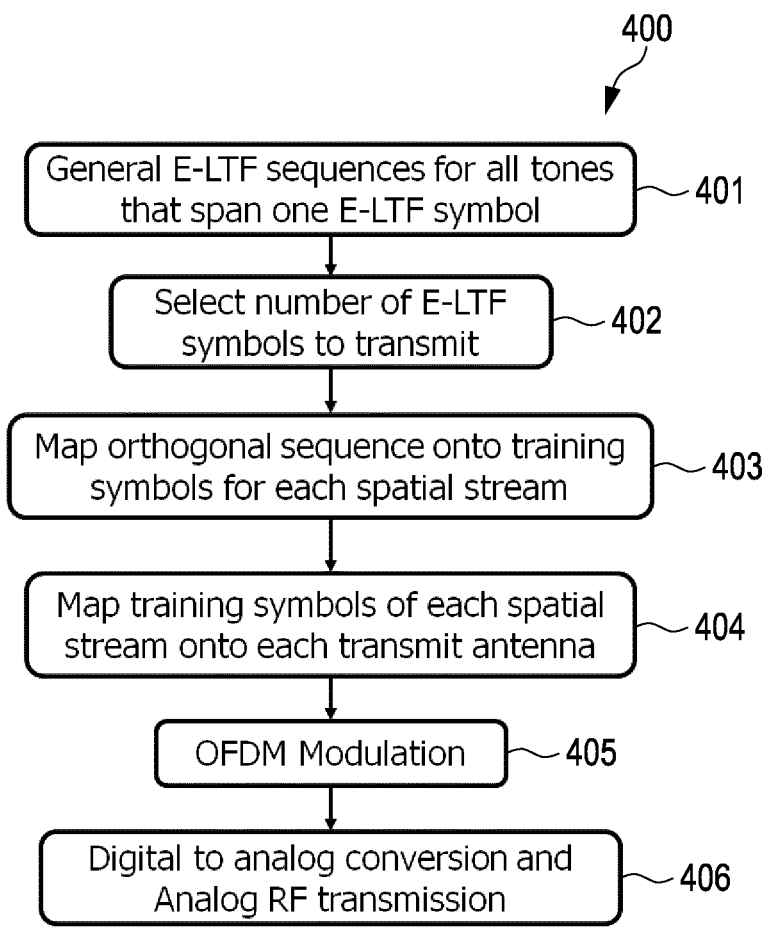
FIG. 12 shows a flow chart of another embodiment of a first communication method of the first communication device according to the present disclosure.

FIG. 12 shows a flow chart 400 summarizing the main operations done at the transmitter according to the present disclosure. In a first step 401 the E-LTF sequences are defined from several types, e.g. from three types (1×HE-LTF, 2×HE-LTF, and 4×HE-LTF) as defined in the standard amendment IEEE 802.11ax. In a second step 402 the number of E-LTF symbols ($N_{E-LTF}$; representing the first number) is defined based on the number of spatial streams and interference conditions. In a third step 403 $N_{E-LTF}$ training symbols (each spanning many tones) per each spatial stream to transmit are generated. In a fourth step 404 the symbols of each spatial stream are mapped into the transmit antennas via a spatial mapping defined by the Q matrix as defined in the standard amendment IEEE 802.11ax. In a fifth step 405 the OFDM modulation is a standard procedure that involves creating a time domain signal that combines all frequency tones for each E-LTF symbol. In a sixth step the digital signals assigned to each antenna are converted into analog signals and mapped into waveforms that are finally transmitted via radio frequency (RF) waves.

Adding more orthogonal sequences, as proposed according to the present disclosure, can also enable more spatial streams to be transmitted, e.g., support 16 spatial streams for IEEE802.11be. In addition, in the case of overlapping BSSs (OBSS), if there is coordination between BSSs to start a PPDU at the same time, then the orthogonal sequences can be assigned in such a way that the BSSs use different sequences so that their cross-interference can be reduced.

In the following receiver aspects for interference channel estimation and suppression will be described.

The preamble of the PPDU contains several legacy training and signaling fields in addition to signaling fields corresponding to the latest standard amendment. This means that, before the E-LTF signals are received, the receiver should have achieved synchronization and successfully decoded all required parameters to decode the E-LTF signals.

Figure 13:
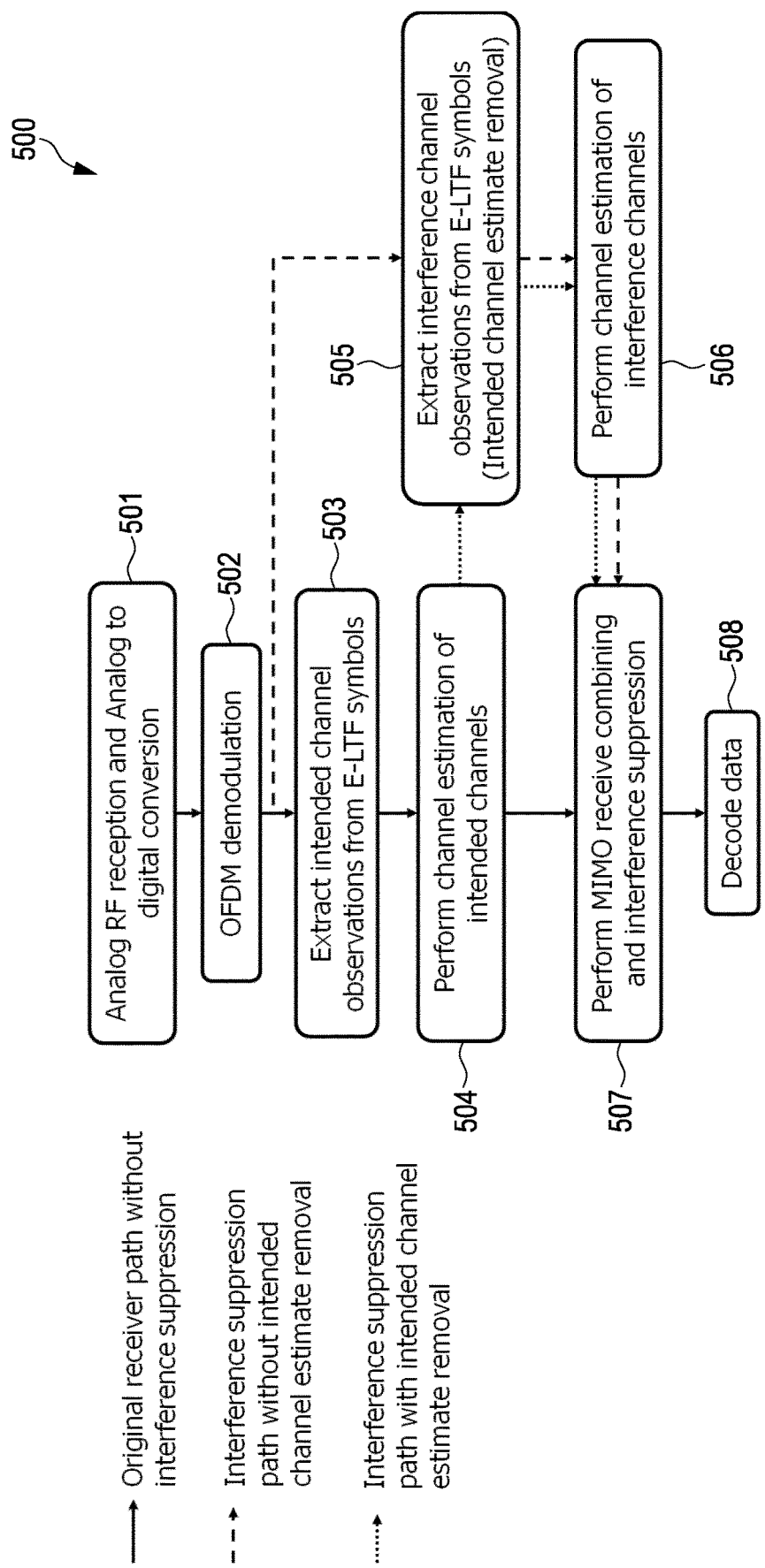
FIG. 13 shows a flow chart of another embodiment of a second communication method of the second communication device according to the present disclosure.

FIG. 13 shows a flow chart 500 summarizing the main operations done at the receiver according to the present disclosure to suppress the effect of interference with MIMO processing based on E-LTF signals. In a first step 501 the PPDU is processed in the RF analog domain, then converted into digital signals and OFDM demodulated in step 502. At this point, the receiver can obtain the received E-LTF symbols and data payload symbols for each tone. The received E-LTF symbols can be represented as $$Y_k = H_k [A^k_{E-LTF}]_{1:N_{sts},:} ELTF_k + Y_k^{Int} + N_k^o$$

where $H_k$ represents the equivalent channel matrix (including the effect of beamforming) at tone k of size $N_{rx} \times N_{sts}$ where $N_{rx}$ is the number of antennas at the receiver. The matrix $$[A^k_{E-LTF}]_{1:N_{sts},:}$$

corresponds to the first $N_{sts}$ rows of the $A_{E-LTF}^k$ matrix since the rest are not transmitted. It is important to note that $N_{sts}$ rows of the $A_{E-LTF}^k$ matrix are assigned the spatial streams of intended STAs, whether they are the first or last or other combination does not change the application of the proposed methods. The matrix $N_k^o$ represents the noise and the matrix $Y_k^{Int}$ represents the interference.

To extract the (one or more) intended channel observations of one or more intended channels (i.e. channels with intended STAs), denoted as $\hat{Y}_k$, the receiver performs the following operations in step 503. The E-LTF sequence is removed by multiplying $Y_k$ with $ELTF_k$ ($ELTF_k$ can be e.g. "1", "−1", "0", or complex numbers with modulus 1). The received signal after removing the E-LTF sequences is denoted as $Y_k^{NE}$.

Subsequently, one or more intended channel observations are obtained for each spatial stream. This may be done by selecting all columns of received matrices for $N_{wt}$ neighboring tones and concatenating them such that $$\hat{Y}_k = [Y_{I_k}^{NE}, Y_{I_k+1}^{NE}, \ldots, Y_{I_k+N_{wt}-1}^{NE}]$$

where $I_k$ is a tone index chosen such that $k \geq I_k$ and $k \leq I_k + N_{wt} - 1$.

After having channel observations of intended STAs the corresponding channel estimates are found in step 504 by doing a matrix multiplication with the complex conjugate of the rows of the $P_{E-LTF}$ matrix that were assigned each spatial stream. Thus, the channel estimates can be obtained as $$\hat{H}_k = \frac{1}{N_{col-P_{E-LTF}}} \hat{Y}_k [(P_{E-LTF})^H]_{1:N_{sts}}$$

where $N_{col-P_{E-LTF}}$ corresponds to the number of columns in the $P_{E-LTF}$ matrix.

To extract the (one or more) interference channel observations of one or more interference channels, denoted as $\hat{Y}_k^i$, the receiver can use the original E-LTF symbols and/or intended channel removal methods based on previously obtained estimates from the intended channels. As an example, the receiver can perform the following operations in step 505. The E-LTF sequence is removed by multiplying $Y_k$ with $ELTF_k$ (wherein $ELTF_k$ can be e.g. "1", "−1", "0", or complex numbers with modulus 1). The received signal after removing the E-LTF sequences is denoted as $Y_k^{NE}$.

Subsequently, one or more interference channel observations are obtained. This may be done by selecting all columns of received matrices for $N_{wt}$ neighboring tones and concatenating them. Then, a matrix multiplication is done with the complex conjugate of the rows of the $P_{E-LTF}$ matrix that were not assigned any spatial stream. That is, $$\hat{Y}_k^i = [Y_{I_k}^{NE}, Y_{I_k+1}^{NE}, \ldots, Y_{I_k+N_{wt}-1}^{NE}][(P_{E-LTF})^H]_{N_{sts}+1:N_{col-P_{E-LTF}}}$$

where $I_k$ is a tone index chosen such that $k \geq I_k$ and $k \leq I_k + N_{wt} - 1$.

Another variant is to perform intended channel removal by subtracting the channel estimates of intended transmitters. This operation yields:

$$\hat{Y}_k^i = [Y_{I_k}^{NE}, \ldots, Y_{I_k+N_{wt}-1}^{NE}] - [\hat{H}_{I_k}[A_{E-LTF}^{I_k}]_{1:N_{sts},:} ELTF_{I_k},$$
$$\ldots, \hat{H}_{I_k+N_{wt}-1}[A_{E-LTF}^{I_k+N_{wt}-1}]_{1:N_{sts},:} ELTF_{I_k+N_{wt}-1}]$$

The interference channel estimates are obtained in step 506 by simply normalizing the interfering channel observations such that:

$$\hat{H}_k^i = \frac{1}{\sqrt{tr(\hat{Y}_k^i \hat{Y}_k^{i H})}} \hat{Y}_k^i$$

where tr(•) refers to the trace operator.

After having intended channel estimates and interference channel estimates, the following MIMO combining matrix can be computed in step 507, for each data tone, to suppress the effect of interference at the receiver:

$$V_k = (\hat{H}_k \hat{H}_k^H + \alpha_n I_{N_{rx}} + \alpha_i \hat{H}_k^i \hat{H}_k^{i H})^{-1} \hat{H}_k$$

where the scalar parameters $\alpha_n$ and $\alpha_i$ are regularization terms.

The matrix $V_k$ has size $N_{rx} \times N_{sts}$ and to decode the data symbols received in the $k^{th}$ tone, the receiver needs to multiply its transpose complex conjugate with the received symbols from all antennas corresponding to the data payload of the PPDU. That is, $$\hat{s}_k = V_k^H y_k^{RX}$$

where $y_k^{RX}$ is the received signal from antennas for a given data symbol in the $k^{th}$ tone, and $\hat{s}_k$ contains the data symbol estimates for each transmitted spatial stream. Finally, the receiver can decode the data from the data symbol estimates in step 508.

The demapping operation applied by the receiver may work as follows (using an example). Assuming 8 tones numbered from −3 to 4 (i.e., [−3 −2 −1 0 1 2 3 4]), where the first, last and middle tones are reserved, that is, tones indexed by −3, 0, and 4 are not used, the number of tone sets (fourth number) is two, which is equal to the number of portions of orthogonal sequences. The mapping done at the transmitter side was for odd tones to have portion 1 and even tones portion 2.

A table to reference tone index with portion of orthogonal sequences is as follows:
Tone index: [−3 −2 −1 0 1 2 3 4]
Portion mapped: [1 2 1 2 1 2 1 2]

Reserved tones are not transmitted so the mapping for these tones is not important. The number of symbols (first number) is two, thus, the number of orthogonal sequences (second number) is four (product of first number and fourth number) and each sequence has also four elements.

The demapping at the receiver needs to find which tones and symbols to use to obtain the channel observations for each tone. A detailed demapping to obtain such channel observations for each tone index (note that reserved tones are not processed) may be as follows: For channel observations of tone index −2, portion 1 is extracted from tone −1 in both symbols and portion 2 is extracted from tone −2 in both symbols. For channel observations of tone index −1, portion 1 is extracted from tone −1 in both symbols and portion 2 is extracted from tone −2 in both symbols. For channel observations of tone index 1, portion 1 is extracted from tone 1 in both symbols and portion 2 is extracted from tone 2 in both symbols. For channel observations of tone index 2, portion 1 is extracted from tone 1 in both symbols and portion 2 is extracted from tone 2 in both symbols. For channel observations of tone index 3, portion 1 is extracted from tone 3 in both symbols and portion 2 is extracted from tone 2 in both symbols. The channel observations for each tone are comprised of four samples (same size as the elements of the orthogonal sequences) obtained from the two symbols per tone (demapped using two tones, the fourth number is two in this case).

To extract the two parts, one for intended channel estimation and another for interference channel estimation, the previously demapped channels observations per tone (four samples in the example) are processed as follows: The part for intended channel estimation is extracted by projecting the channel observations with the orthogonal sequences that were transmitted by each spatial stream. The part for interference channel estimation is extracted by projecting the channel observations with the orthogonal sequences that were not transmitted (the ones that were left unused). A variant is to use the intended channel estimates to subtract the intended signals from the channel observations to improve the interference channel estimation.

According to the present disclosure it is assumed that the number of orthogonal sequences (second number) is larger than the number of spatial streams (third number). This provides unused orthogonal sequences that can be used for the interference channel estimation.

Thus, according to the present disclosure, the transmission training sequences contain distinct orthogonal sequences. The transmission training sequences are mapped to the training symbols and the result forms the training field. Each spatial stream is identified by a distinct orthogonal sequence which has been mapped to the training symbols. Since there may be more than one spatial stream, after mapping distinct orthogonal sequences with the training symbols there are distinct sets of training symbols, one per spatial stream. The already distinct sets of training symbols are then mapped to transmit antenna along with the payload data per spatial stream The present disclosure may obtain one or more of the following advantages. Adding more channel observations for interference enables the receiver to estimate the interfering channel and perform MIMO interference suppression. This increases the robustness of communications and avoids retransmissions, which in turn reduces latency. Adding more orthogonal sequences may further enable channel sounding of more spatial streams with same time overhead and reduce interference between OBSSs by coordinating the orthogonal sequences allocation among BSSs.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium 51 carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits or circuitry. A circuit is a structural assemblage of electronic components including conventional circuit elements, integrated circuits including application specific integrated circuits, standard integrated circuits, application specific standard products, and field programmable gate arrays. Further, a circuit includes central processing units, graphics processing units, and microprocessors which are programmed or configured according to software code. A circuit does not include pure software, although a circuit includes the above-described hardware executing software. A circuit or circuitry may be implemented by a single device or unit or multiple devices or units, or chipset(s), or processor(s).

It follows a list of further embodiments of the disclosed subject matter:

1. First communication device configured to transmit data to a second communication device, the first communication device comprising circuitry configured to:
   generate a second number of mutually orthogonal sequences;
   generate a third number of one or more spatial streams, each spatial stream carrying payload data;
   split each of a first number of training symbols into a fourth number of tone sets, each training symbol spanning a plurality of tones;
   split each orthogonal sequence into a fourth number of portions;
   generate a training field by mapping elements of the corresponding portion of the orthogonal sequences onto the tone sets of the training symbols; and
   arrange the training field before and/or between the payload data of the spatial streams to enable channel estimation by the second communication device.

2. First communication device as defined in any one of the preceding embodiments, wherein the product between the first number and the fourth number is greater than or equal to the third number.

3. First communication device as defined in any one of the preceding embodiments, wherein the number of elements of each orthogonal sequence is equal to the product between the first number and the fourth number 4. First communication device as defined in any one of the preceding embodiments, wherein the circuitry is configured to map a first portion of each orthogonal sequence onto a first tone set of the training symbols and to map a second portion of each orthogonal sequence onto a second tone set of the training symbols.

5. First communication device as defined in any one of the preceding embodiments, wherein the circuitry is configured to map a first portion of each orthogonal sequence onto a first tone set comprising odd-numbered tones of the training symbols and to map a second portion of each orthogonal sequence onto a second tone set comprising even-numbered tones of the training symbols.

6. First communication device as defined in any one of the preceding embodiments, wherein the circuitry is configured to map the elements of a first portion of an orthogonal sequence and the elements of a second portion of the same orthogonal sequence onto neighboring tones of the training symbols.

7. First communication device as defined in any one of the preceding embodiments, wherein the circuitry is configured to determine a fifth number of neighboring tones forming a group of neighboring tones onto which portions of an orthogonal sequence can be mapped by measuring channel correlation between tones.

8. First communication device as defined in any one of the preceding embodiments, wherein the circuitry is configured to obtain signaling information from the second communication device, said signaling information indicating if a fifth number of a group of neighboring tones, onto which portions of an orthogonal sequence can be mapped, should be increased or decreased, and/or including information indicating the first number and/or the fourth number.

9. First communication device as defined in any one of the preceding embodiments, wherein the circuitry is configured to identify a spatial stream by a distinct orthogonal sequence, wherein the training field contains a third number of distinct sets of training symbols that have been mapped with distinct orthogonal sequences.

10. First communication device as defined in embodiment 9,
wherein the circuitry is configured to directly or indirectly map corresponding sets of training symbols and payload data of each spatial stream onto transmit antennas using multiple input multiple output, MIMO, techniques.

11. Second communication device configured to receive data from a first communication device, the second communication device comprising circuitry configured to:
obtain one or more intended channel observations of one or more channels between the first communication device and the second communication device based on at least a part of a training field, the training field being arranged before and/or between the payload data of a third number of one or more spatial streams received from the first communication device, wherein each spatial stream carries payload data, each of a first number of training symbols is split into a fourth number of tone sets and spans a plurality of tones, and a second number of mutually orthogonal sequences is each split into a fourth number of portions, wherein elements of a corresponding portion of the orthogonal sequences are mapped onto the tone sets of the training symbols to generate the training field;
perform interference channel estimation of the one or more potential interference channels based on another part of said training field; and
perform interference suppression based on interference channel estimation information resulting from the interference channel estimation.

12. Second communication device as defined in embodiment 11,
wherein the circuitry is configured to demap a first portion of the orthogonal sequences from a first tone set of the training symbols and a second portion of the orthogonal sequences from a second tone set of the training symbols to obtain the intended channel observations and optionally interference channel observations.

13. Second communication device as defined in embodiment 11 or 12,
wherein the circuitry is configured to transmit signaling information from the second communication device, said signaling information indicating if a fifth number of a group of neighboring tones, onto which portions of an orthogonal sequence can be mapped, shall be increased or decreased, and/or including information indicating the first number and/or the fourth number.

14. Second communication device as defined in any one of embodiments 11 to 13, wherein the circuitry is configured to obtain one or more interference channel observations of one or more potential interference channels based on another part of said training field.

15. Second communication device as defined in any one of embodiments 11 to 14, wherein the circuitry is configured to perform intended channel estimation of the one or more channels based on the obtained intended channel observations and/or to decode data from the received spatial streams.

16. Second communication device as defined in any one of embodiments 11 to 15, wherein the circuitry is configured to use interference channel estimates to compute an estimate of a covariance matrix of the interference channel that describes spatial directions from which interference comes from, and to generate a spatial filter to combine the signals from reception antennas in a way that the spatial directions spanned by the covariance matrix of the interference are suppressed.

17. Second communication device as defined in any one of embodiments 11 to 16, wherein the circuitry is configured to extract the first part of the training field used for intended channel estimation by projecting the channel observations with the orthogonal sequences that were transmitted by each spatial stream and/or to extract the other part of the training field used for interference channel estimation by projecting the channel observations with the orthogonal sequences that were not transmitted.

18. First communication method of transmitting data to a second communication device, the first communication method comprising:
generate a second number of mutually orthogonal sequences;
generate a third number of one or more spatial streams, each spatial stream carrying payload data;
split each of a first number of training symbols into a fourth number of tone sets, each training symbol spanning a plurality of tones;
split each orthogonal sequence into a fourth number of portions;
generate a training field by mapping elements of the corresponding portion of the orthogonal sequences onto the tone sets of the training symbols; and
arrange the training field before and/or between the payload data of the spatial streams to enable channel estimation by the second communication device.

19. Second communication method of receiving data from a first communication device, the second communication method comprising:
obtain one or more intended channel observations of one or more channels between the first communication device and the second communication device based on at least a part of a training field, the training field being arranged before and/or between the payload data of a third number of one or more spatial streams received from the first communication device, wherein each spatial stream carries payload data, each of a first number of training symbols is split into a fourth number of tone sets and spans a plurality of tones, and a second number of mutually orthogonal sequences is each split into a fourth number of portions, wherein elements of a corresponding portion of the orthogonal sequences are mapped onto the tone sets of the training symbols to generate the training field;
perform interference channel estimation of the one or more potential interference channels based on another part of said training field; and
perform interference suppression based on interference channel estimation information resulting from the interference channel estimation.

20. A non-transitory computer-readable recording medium that stores therein a computer program product, which, when executed by a processor, causes the method according to embodiment 18 or 19 to be performed.

21. A computer program comprising program code means for causing a computer to perform the steps of said method according to embodiment 18 or 19 when said computer pro-gram is carried out on a computer.

The invention claimed is:
1. A first communication device configured to transmit data to a second communication device, the first communication device comprising:

circuitry configured to:
generate a second number of mutually orthogonal sequences;
generate a third number of one or more spatial streams, each spatial stream carrying payload data;
split each of a first number of training symbols into a fourth number of tone sets, each training symbol spanning a plurality of tones;
split each orthogonal sequence into the fourth number of portions,
generate a training field by mapping elements of the corresponding portion of the orthogonal sequences onto the tone sets of the training symbols; and
arrange the training field before and/or between the payload data of the spatial streams to enable channel estimation by the second communication device.

2. The first communication device as claimed in claim 1, wherein the product between the first number and the fourth number is greater than or equal to the third number.

3. The first communication device as claimed in claim 1, wherein the number of elements of each orthogonal sequence is equal to the product between the first number and the fourth number.

4. The first communication device as claimed in claim 1, wherein the circuitry is configured to map a first portion of each orthogonal sequence onto a first tone set of the training symbols and to map a second portion of each orthogonal sequence onto a second tone set of the training symbols.

5. The first communication device as claimed in claim 1, wherein the circuitry is configured to map a first portion of each orthogonal sequence onto a first tone set comprising odd-numbered tones of the training symbols and to map a second portion of each orthogonal sequence onto a second tone set comprising even-numbered tones of the training symbols.

6. The first communication device as claimed in claim 1, wherein the circuitry is configured to map the elements of a first portion of an orthogonal sequence and the elements of a second portion of the same orthogonal sequence onto neighboring tones of the training symbols.

7. The first communication device as claimed in claim 1, wherein the circuitry is configured to determine a fifth number of neighboring tones forming a group of neighboring tones onto which portions of an orthogonal sequence can be mapped by measuring channel correlation between tones.

8. The first communication device as claimed in claim 1, wherein the circuitry is configured to obtain signaling information from the second communication device, said signaling information indicating if a fifth number of a group of neighboring tones, onto which portions of an orthogonal sequence can be mapped, should be increased or decreased, and/or including information indicating the first number and/or the fourth number.

9. The first communication device as claimed in claim 1, wherein the circuitry is configured to identify a spatial stream by a distinct orthogonal sequence, wherein the training field contains the third number of distinct sets of training symbols that have been mapped with distinct orthogonal sequences.

10. The first communication device as claimed in claim 9, wherein the circuitry is configured to directly or indirectly map corresponding sets of training symbols and payload data of each spatial stream onto transmit antennas using multiple input multiple output, (MIMO) techniques.

11. A second communication device configured to receive data from a first communication device, the second communication device comprising:
circuitry configured to:
obtain one or more intended channel observations of one or more channels between the first communication device and the second communication device based on at least a part of a training field, the training field being arranged before and/or between payload data of a third number of one or more spatial streams received from the first communication device, wherein each spatial stream carries the payload data, each of a first number of training symbols is split into a fourth number of tone sets and spans a plurality of tones, and a second number of mutually orthogonal sequences is each split into the fourth number of portions, wherein elements of a corresponding portion of the orthogonal sequences are mapped onto the tone sets of the training symbols to generate the training field;
perform interference channel estimation of one or more potential interference channels based on another part of said training field; and
perform interference suppression based on interference channel estimation information resulting from the interference channel estimation.

12. The second communication device as claimed in claim 11, wherein the circuitry is configured to demap a first portion of the orthogonal sequences from a first tone set of the training symbols and a second portion of the orthogonal sequences from a second tone set of the training symbols to obtain the one or more intended channel observations and optionally interference channel observations.

13. The second communication device as claimed in claim 11, wherein the circuitry is configured to transmit signaling information from the second communication device, said signaling information indicating if a fifth number of a group of neighboring tones, onto which portions of an orthogonal sequence can be mapped, shall be increased or decreased, and/or including information indicating the first number and/or the fourth number.

14. The second communication device as claimed in claim 11, wherein the circuitry is configured to obtain one or more interference channel observations of the one or more potential interference channels based on another part of said training field.

15. The second communication device as claimed in claim 11, wherein the circuitry is configured to perform intended channel estimation of the one or more channels based on the one or more intended channel observations and/or to decode data from the received spatial streams.

16. The second communication device as claimed in claim 11, wherein the circuitry is configured to:
use interference channel estimates to compute an estimate of a covariance matrix of an interference channel that describes spatial directions from which interference comes from, and
combine the signals from reception antennas in a way that the spatial directions spanned by the covariance matrix of the interference are suppressed.

17. The second communication device as claimed in claim 11, wherein the circuitry is configured to extract a first part of the training field used for intended channel estimation by projecting the one or more intended channel observations with the orthogonal sequences that were transmitted by each spatial stream and/or to extract the other part of the training field used for interference channel estimation by projecting the one or more intended channel observations with the orthogonal sequences that were not transmitted.

18. A method of transmitting data from a first communication deice to a second communication device, the method comprising:
- generating a second number of mutually orthogonal sequences;
- generating a third number of one or more spatial streams, each spatial stream carrying payload data;
- splitting each of a first number of training symbols into a fourth number of tone sets, each training symbol spanning a plurality of tones;
- splitting each orthogonal sequence into the fourth number of portions;
- generating a training field by mapping elements of the corresponding portion of the orthogonal sequences onto the tone sets of the training symbols; and
- arranging the training field before and/or between the payload data of the spatial streams to enable channel estimation by the second communication device.

19. A method of receiving data by a second communication device from a first communication device, the second communication method comprising:
- obtaining one or more intended channel observations of one or more channels between the first communication device and the second communication device based on at least a part of a training field, the training field being arranged before and/or between the payload data of a third number of one or more spatial streams received from the first communication device, wherein each spatial stream carries payload data, each of a first number of training symbols is split into a fourth number of tone sets and spans a plurality of tones, and a second number of mutually orthogonal sequences is each split into the fourth number of portions, wherein elements of a corresponding portion of the orthogonal sequences are mapped onto the tone sets of the training symbols to generate the training field;
- performing interference channel estimation of one or more potential interference channels based on another part of said training field; and
- performing interference suppression based on interference channel estimation information resulting from the interference channel estimation.

20. A non-transitory computer-readable recording medium storing instructions that, when executed by circuitry, cause the circuitry to perform the method according to claim 18 or 19.

* * * * *